United States Patent
Jakoby et al.

(10) Patent No.: US 7,101,637 B2
(45) Date of Patent: Sep. 5, 2006

(54) PROTON CONDUCTIVE MEMBRANE FOR ELECTROMECHANICAL APPLICATIONS

(75) Inventors: Kai Jakoby, Düsseldorf (DE); Suzana Nunes Pereira, Geesthacht (DE); Klaus-Victor Peinemann, Geesthacht (DE)

(73) Assignee: GKSS-Forschungszentrum Geesthacht, Geesthacht (DE)

( * ) Notice: Subject to any disclaimer, the term of this patent is extended or adjusted under 35 U.S.C. 154(b) by 473 days.

(21) Appl. No.: 10/303,071

(22) Filed: Nov. 23, 2002

(65) Prior Publication Data

US 2004/0101731 A1    May 27, 2004

(51) Int. Cl.
*H01M 8/10*    (2006.01)

(52) U.S. Cl. .......................... 429/30; 429/310; 521/27; 521/25

(58) Field of Classification Search ................. 429/30, 429/33, 310; 521/27, 25
See application file for complete search history.

(56) References Cited

FOREIGN PATENT DOCUMENTS

| EP | 1 238 998 | * | 9/2002 |
| JP | 58-8507 | * | 1/1983 |
| JP | 2002-146015 | * | 5/2002 |

* cited by examiner

*Primary Examiner*—Laura Weiner
(74) *Attorney, Agent, or Firm*—Klaus J. Bach

(57) ABSTRACT

A proton-conductive membrane for electrochemical applications, particularly for use in fuel cells, is provided. The membrane consists of a polymer based on a base polymer, other than a vinyl polymer, which includes aromatic rings and also sulfonic acid groups which are bound covalently directly to the aromatic rings of the base polymer, that is, without spacer groups therebetween.

4 Claims, No Drawings

US 7,101,637 B2

PROTON CONDUCTIVE MEMBRANE FOR ELECTROMECHANICAL APPLICATIONS

BACKGROUND OF THE INVENTION

The invention relates to a proton conductive membrane for electrochemical applications, a polymer for the manufacture of the membrane and the use of the membrane in a fuel cell.

Fuel cells are considered to be promising low-emission alternatives for conventional energy generation apparatus. For mobile applications, the polymer electrolyte membrane fuel cell (PEM) is of particular interest. A proton-conductive polymer membrane is the main component in this type of fuel cell. Nafion®, which is a perfluorinated polymer with sulfonic acid side groups as produced by Dupont and similar products made by Asahi are still the market-dominating membrane materials for electrolyte membrane fuel cells.

Much research has been done with the aim to use other polymers as membrane materials in fuel cells. These polymers however are almost exclusively sulfonated materials whose proton conductivity is based on sulfonic acid groups.

In a relatively recent publication (M. Yamabe, K. Akijama, Y. Akatsuka, M. Kato, Novel phosphonated perfluorocarbon polymers, Eur. Polym. J. 36(2000) 1034–41), the synthesis of perfluorinated polymers with phosphonic acid side groups based on perfluorovinyloxy-substituted phosphonic acid as monomers is described which are then co-polymerized with tetrafluoroethylene and perfluoropropylvinyl ether. The use of such polymers in fuel cells is disclosed in U.S. Pat. No. 6,087,032.

Additional fuel cell membranes of polymers with phosphoric acid side groups are described for example in U.S. Pat. No. 5,422,411. These known polymers are made by radical homo- and co-polymerization of α, β, β-trifluorosstyrol-4-phosphoric acid esters and subsequent ester hydrolysis. The product obtained is a polystyrol with perfluorinated main chain, which functionalizes on the phenyl rings with phosphoric acid groups.

Additional polymers for use in fuel cells are described in U.S. Pat. No. 5,679,482. They are fluorine-free styrol copolymers with a mixed functionalization from sulfonic acid and phosphonic acid groups. The patent describes primarily SEBS-copolymers whose styrol units can be phosphonated by conversion with $ClCH_2PO(OR)_2$. In the product, the phosphonic acid groups are not directly bound to the aromatic rings but by way of a methylene unit.

Also, U.S. Pat. No. 4,605,685 deals with the phosphonization of vinyl polymers which are used however for the development of cation exchanger membranes. The phosphonization of polybenzimidazole is described in U.S. Pat. No. 5,599,639; here lithium hydride is converted with $BrCF_2PO(OR)_2$. In the product obtained, the phosphonic acid groups are bound covalently to nitrogen atoms of the imidazole rings by way of $CF_2$ units.

The first research for the use of phosphonated polymers in fuel cells was published by Cabasso (X. Xu, I. Cabasso, Preliminary study of phosphonate ion exchange membranes for PEM fuel cells, Polym. Mat. Sci. Eng. 68(1993) 120–121). For the manufacture of membranes, a phosphonated polyphenyl oxide and polymer blends prepared therefrom were used. Also in this polymer, whose synthesis is described in U.S. Pat. No. 4,073,754, the phosphonic acid groups are separated from the aromatic rings of the polymer main chain by the methylene units. These alkylene spacers reduce the chemical stability of the materials with respect to oxidation means and therefore detrimentally affect the long-term stability of the membranes during operation of a fuel cell.

An essential disadvantage of the initially mentioned perfluorinated materials such as Nafion® is the high price of these materials. With the use of fluorine-free aromatic polymers, it might be possible to lower the material costs without detrimentally affecting the chemical stability. The literature therefore includes numerous examinations directed at the sulfonization of polysulphones, polyether ketones, polyether ether ketones, polyamides and polyphosphazenes. However, all these materials have numerous disadvantages.

It is the object of the present invention to provide an arylpolymer with phosphonic acid side groups, which can be used for the manufacture of improved proton-conductive membranes. It is further an object of the invention to provide such a membrane.

SUMMARY OF THE INVENTION

A proton-conductive membrane for electrochemical applications, particularly for use in fuel cells is provided. The membrane consists of a polymer based on a base polymer, other than a vinyl polymer, which includes aromatic rings and also sulfonic acid groups which are bound covalently directly to the aromatic rings of the base polymer, that is, without spacer groups therebetween.

In the membrane according to the invention, a polymer-based on a base polymer with aromatic rings is utilized which however is not a vinyl polymer. This polymer, which may also be designated an aryl polymer, is phosphonated in such a way that the phosphonic acid groups are bound co-valently directly to the aromatic rings of the base polymer. In other words, there are no spacer groups as it is the case with the conventional phosphonated membranes, or respectively, polymers.

The polymer including phosphonic acid groups preferably includes additional sulfonic acid groups that is, it may be modified thereby.

The base polymer is preferably a polymer from the class of the polysulfones, the polyethersulfones, the polyether ketones, the ploy ether ether ketones, the polyacrylene oxides, the polyacrylene sulfides, the polyimides, the polybenzimidazoles, the polyoxadiazoles, the polytriazoles and the polyphosphazines.

Methods for the direct phosphonization of aromatic rings are also known but they have been found to be unsuitable in a polymer-analog embodiment. For example, the Friedel-Crafts-reaction with $PCl_2$ and $AlCl_3$ is the most simple and least expensive way of direct aromatic phosphonization. It is however known (M. Hartmann, U. Ch. Hipler, H. Carlsohn, Synthese von Styrencopolymeren ungesättigter Phosphonsäuren, Acta polymerica 31 (1980) 165–8), that this reaction results at the polymer almost exclusively in cross-linked products because of the trifunctionality of $PCl_3$.

For the manufacture of the polymer according to the invention and the membrane according to the invention, a three-stage process for the phosphonization has been developed. In this process, the base polymer is in a stage a) bromized or iodized. In stage b), the bromized or iodized polymer is reacted with one or several phosphonic acid esters and/or one or several phosphoric acid esters in the presence of a transition metal catalyst.

The resulting polymer aryl phosphonic acid esters are then hydrolized in a stage c) to form phosphonic acid. The products obtained in this way are soluble in many polar organic solvents but are insoluble in methanol and water.

The products can be manufactured from the solution into mechanically and thermally stable films, which can be used as membranes.

It has further been found advantageous to use a solvent in the described conversion.

With the phosphonated polymers, the thermal stability of the fuel cell membranes made therefrom can be improved such that the operating temperature of PEM-fuel cells can be increased.

Below the invention will be described in greater detail on the basis of examples.

EXAMPLE 1

Bromating of Radel Polysulfone

The bromation is performed in accordance with the method described in U.S. Pat. No. 4,999,415. The bromium content in the bromated polymer was determined by elementary analysis. The composition of the product corresponded to the sum formula $C_{24}H_{14}SO_4Br_2$. The substitution degree was 200% (per repetition unit of the polymer).

EXAMPLE 2

Phosphonating of the Dibromated Radel Polysulfone (RBr) from Example 1.

A solution of 10.0 g RBr in a mixture of 50 ml 1,2 dichlorobenzene, 20 ml Diethyl phosphate and 5 ml triethylamin were trickled under a protective argon atmosphere into a 90° C. heated solution of 0.3 g Pd(PPh$_3$)$_4$ in a mixture of 50 ml 1,2dichlorobenzene, 20 ml diethylphosphite and 5 ml triethylamine. The reaction mixture was then heated to 130° C. for 96 hours in the dark. During this period, further 0.3 g Pd(PPh$_3$)$_4$, 40 ml diethyl phosphite and 10 ml triethylamine were successively added. After 96 hours, the polymer was precipitated in methanol was then mixed into chloroform and then again precipitated in methanol. After drying in a vacuum, 8.0 g of the product was obtained. The content of phosphonic acid ester groups was determined by $^1$H-NMR-spectroscopy and elementary analysis. Repeatedly a substitution degree of 58% per repitition unit of the polymer was obtained.

EXAMPLE 3

Phosphonating of the Dibromated Polysulfone (RBr from Example 1)

The reaction preparation of example 2 was repeated. Instead of the Pd(PPh$_3$)$_4$,0.3 g Pd$_2$(dba)$_3$CHCl$_3$ (dba=dibenzylide acetone) was used as catalyst.

The reaction mixture was heated for 96 hour to 120° C.

During this period additional 0.2 g catalyst, 70 ml diethylphosphit and 10 ml triethylamine were successively added. 8.5 g product was obtained. By $^1$H-NMR spectroscopy and elementary analysis, it was deteremined that the substitution degree of phosphonic acid ester groups in the product was 77% per repetition unit of the polymer.

EXAMPLE 4

Phosphoniting of the Dibromated Radel Polysulfonic (RBr) from Example 1.

A solution of 10.0 g RBR and 0.3 g PD$_2$(dba)$_3$CHCl$_3$ in a mixture of 30 ml diphenylether, 60 diethyl phosphit and 5 ml triethylamine were heated under an argon atmosphere first for 1 hour to 90° C. and then for 96 hour to 120° C. During this period further 0.2 g catalyst, 40 ml diethylphosphate nd 15 ml triethylamine were successively added. After 96 hours, the polymer was precipitated in methanol. After drying under vacuum, 9.5 g product was obtained. The content of phosphonic acid groups was determined by $^1$H-NMR spectroscopy and elementary analysis. A substitution degree of 88% per repetition unit of the polymer was determined.

EXAMPLE 5

Hydrolysis of the Polymer Phosphonic Acid Ester of the Examples 2–4.

The phosphonated RBr of the examples 2–4 was suspended in 48% bromine hydrogen acid and heated for 24 hours with condensate return. Subsequently, the polymer was filtered out and thoroughly washed with water. By $^1$H-NMR spectroscopy no intact phosphonic acid ester groups could be detected in the product. In the hydrolyzed product of example 4, the content of free phosphonic acids corresponded to an ion exchanger capacity of 1.6 mmol/g. After addition of 5% concentrated hydrochloric acid, the dried products were easily soluble in dimethylacetamide. From this solution, mechanically and thermally stable polymer films could easily be prepared.

What is claimed is:

1. A proton conductive membrane for electrochemical applications, said membrane consisting of an aryl polymer having aromatic rings, said aryl polymer including phosphonic acid groups which are bound covalently and directly, without an intermediate spacer group, to the aromatic rings of the aryl polymer, and sulfonic acid groups which are bound to said aryl polymer.

2. A membrane according to claim 1, wherein said aryl polymer is a polymer from the class of the polysulfones.

3. A proton-conductive membrane according to claim 1, wherein the electrochemical applications are fuel cells.

4. A fuel cell including a proton-conductive membrane Consisting of an aryl polymer, which includes aromatic rings and phosphonic acid groups, which are bound covalently and directly, without an intermediate spacer group, to the aromatic rings of the aryl polymer and additionally sulfonic acid groups which are bound to said aryl polymer.

* * * * *